US010744404B2

(12) United States Patent
Ogasawara et al.

(10) Patent No.: US 10,744,404 B2
(45) Date of Patent: Aug. 18, 2020

(54) INFORMATION PROCESSING SYSTEM, INFORMATION PROCESSING APPARATUS, COMPUTER-READABLE NON-TRANSITORY STORAGE MEDIUM HAVING STORED THEREIN INFORMATION PROCESSING PROGRAM, AND HAND-HELD INFORMATION PROCESSING APPARATUS

(71) Applicant: NINTENDO CO., LTD., Kyoto (JP)

(72) Inventors: Yoshiyasu Ogasawara, Kyoto (JP); Tomohisa Kawakami, Kyoto (JP); Yasuyuki Shimohata, Kyoto (JP); Naoki Hatta, Kyoto (JP)

(73) Assignee: Nintendo Co., Ltd., Kyoto (JP)

( * ) Notice: Subject to any disclaimer, the term of this patent is extended or adjusted under 35 U.S.C. 154(b) by 576 days.

(21) Appl. No.: 15/345,837

(22) Filed: Nov. 8, 2016

(65) Prior Publication Data

US 2017/0128827 A1 May 11, 2017

(30) Foreign Application Priority Data

Nov. 9, 2015 (JP) .................................. 2015-219678

(51) Int. Cl.
*H04N 7/18* (2006.01)
*A63F 13/213* (2014.01)
(Continued)

(52) U.S. Cl.
CPC .......... *A63F 13/213* (2014.09); *A63F 13/235* (2014.09); *A63F 13/426* (2014.09);
(Continued)

(58) Field of Classification Search
CPC .... A63F 13/213; A63F 13/235; A63F 13/426; A63F 13/428; G02B 5/136; G06F 3/011;
(Continued)

(56) References Cited

U.S. PATENT DOCUMENTS 6,466,325 B1 * 10/2002 Gooch ................. G01B 11/002
356/601
7,658,675 B2 * 2/2010 Hotta ...................... A63F 13/06
463/37
(Continued)

FOREIGN PATENT DOCUMENTS

JP 2005-164323 6/2005
JP 2007-54114 3/2007
(Continued)

OTHER PUBLICATIONS

European Search Report dated Apr. 4, 2017, issued in corresponding EP Application No. 16197714.5 (7 pages).
(Continued)

*Primary Examiner* — Jayanti K Patel
*Assistant Examiner* — Richard B Carter
(74) *Attorney, Agent, or Firm* — Nixon & Vanderhye, P.C.

(57) ABSTRACT

Provided is an information processing system including a reflection member, a hand-held information processing apparatus including an imaging section, and an information processing apparatus communicable with the hand-held information processing apparatus. The reflection member is a retroreflecting material. The hand-held information processing apparatus includes the imaging section and a light emitting section. The hand-held information processing apparatus analyzes a captured image, calculates the position of an image of the retroreflecting material corresponding to reflected light from the retroreflecting material, and outputs positional information thereof. The information processing apparatus estimates the orientation or position of the hand-held information processing apparatus on the basis of the positional information, and generates an image based on the result of the estimation.

22 Claims, 13 Drawing Sheets

(51) Int. Cl.

| | |
|---|---|
| *G06F 3/14* | (2006.01) |
| *G06F 3/01* | (2006.01) |
| *G06F 3/03* | (2006.01) |
| *G06F 3/0346* | (2013.01) |
| *H04N 21/422* | (2011.01) |
| *A63F 13/426* | (2014.01) |
| *A63F 13/235* | (2014.01) |
| *A63F 13/428* | (2014.01) |
| *G02B 5/136* | (2006.01) |
| *H04N 5/225* | (2006.01) |
| *H04N 5/33* | (2006.01) |

(52) U.S. Cl.
CPC ............ *A63F 13/428* (2014.09); *G02B 5/136* (2013.01); *G06F 3/011* (2013.01); *G06F 3/0304* (2013.01); *G06F 3/0346* (2013.01); *G06F 3/1423* (2013.01); *H04N 5/2256* (2013.01); *H04N 5/33* (2013.01); *H04N 21/42222* (2013.01); *H04N 5/2254* (2013.01)

(58) Field of Classification Search
CPC .... G06F 3/0304; G06F 3/0346; G06F 3/1423; H04N 5/2256; H04N 5/33; H04N 21/42222; H04N 5/2254
USPC ....................... 348/143; 345/633; 463/31, 37
See application file for complete search history.

(56) References Cited

U.S. PATENT DOCUMENTS

| | | | | |
|---|---|---|---|---|
| 7,708,641 | B2* | 5/2010 | Tawara | ................... A63F 13/10 |
| | | | | 463/31 |
| 8,157,651 | B2* | 4/2012 | Ohta | ....................... A63F 13/00 |
| | | | | 463/37 |
| 2005/0117781 | A1 | 6/2005 | Aoyama | |
| 2007/0052177 | A1 | 3/2007 | Ikeda | |
| 2010/0033427 | A1 | 2/2010 | Marks et al. | |
| 2010/0201808 | A1 | 8/2010 | Hsu | |
| 2011/0298909 | A1 | 12/2011 | Ando et al. | |
| 2012/0119992 | A1 | 5/2012 | Nishida et al. | |
| 2012/0176409 | A1* | 7/2012 | Noge | ................... A63F 13/213 |
| | | | | 345/633 |

FOREIGN PATENT DOCUMENTS

| | | |
|---|---|---|
| JP | 2007-330534 A | 12/2007 |
| JP | 2010-109859 A | 5/2010 |
| JP | 2012-108722 | 6/2012 |
| WO | WO 2008/084523 A1 | 7/2008 |

OTHER PUBLICATIONS

Notice of Reasons for Refusal dated Jun. 25, 2019 in corresponding Japanese Patent Appln. No. 2015-219678, 6 pages.

* cited by examiner

| IDENTIFICATION NO. | POSITION COORDINATES | SIZE | LUMINANCE |
|---|---|---|---|
| 0001 | (xxx,yyy) | 20 | 100 |
| 0002 | (xxx,yyy) | 30 | 100 |
| ⋮ | ⋮ | ⋮ | ⋮ |

FIG. 15

| COMBINATION | TWO-POINT DISTANCE |
|---|---|
| 1-2 | 100 |
| 1-3 | 600 |
| 1-4 | 700 |
| 1-5 | 800 |
| 1-6 | 780 |
| 1-7 | 690 |
| 2-3 | 620 |
| 2-4 | 720 |
| 2-5 | 820 |
| ⋮ | ⋮ |
| 5-6 | 130 |
| 5-7 | 500 |
| 6-7 | 420 |

FIG. 16

| COMBINATION | TWO-POINT DISTANCE |
|---|---|
| 1-2 | 100 |
| 3-4 | 100 |
| 4-5 | 100 |
| 5-6 | 130 |

F I G. 1 7

INFORMATION PROCESSING SYSTEM, INFORMATION PROCESSING APPARATUS, COMPUTER-READABLE NON-TRANSITORY STORAGE MEDIUM HAVING STORED THEREIN INFORMATION PROCESSING PROGRAM, AND HAND-HELD INFORMATION PROCESSING APPARATUS

CROSS REFERENCE TO RELATED APPLICATION

The disclosure of Japanese Patent Application No. 2015-219678, filed on Nov. 9, 2015, is incorporated herein by reference.

FIELD

The exemplary embodiments relate to an information processing system including at least a reflection member, and a hand-held information processing apparatus capable of image processing.

BACKGROUND AND SUMMARY

Conventionally, a game operating apparatus which includes a longitudinal housing having a holding portion to be wrapped and held with a palm of a user, and a game system using such a game operation apparatus, have been known. This operation apparatus is provided with an imaging section at a front end, in the longitudinal direction, of the housing. In the game system, an LED module that emits infrared light (infrared ray) is arranged in the vicinity of a screen of a display. The operating state of the game operating apparatus can be estimated by, for example, capturing an image of the infrared light outputted from the LED module by using the imaging section, and analyzing the position of the infrared light in the captured image.

The game system as described above adopts the configuration in which the LED module that emits infrared light is arranged in the vicinity of the display in order to estimate the operating state of the operation apparatus. Regarding this point, the inventors have realized that the configuration of the game system can be made simpler to achieve the same function as described above.

Therefore, it is an object of the exemplary embodiments to provide an information processing system capable of detecting the position and/or orientation of an operation apparatus with a simple configuration.

In order to attain the object described above, the following configurations are exemplified.

A configuration example is an information processing system including at least a reflection member, a hand-held information processing apparatus capable of image processing, and an information processing apparatus communicable with the hand-held information processing apparatus. The reflection member is a retroreflecting material part. The hand-held information processing apparatus includes an imaging section, a light emitting section, a light source detecting section, a calculator, and an output section. The imaging section captures an image. The light emitting section emits light. The light source detecting section detects, in the image captured by the imaging section, light source images including an image of the retroreflecting material. The image of the retroreflecting material indicates light that has been emitted from the light emitting section and reflected by the retroreflecting material part. The calculator calculates positions, in the captured image, of the detected light source images. The output section outputs positional information indicating the calculated positions. The information processing apparatus includes an image generator that estimates an orientation or a position of the hand-held information processing apparatus on the basis of the positional information outputted from the output section, and generates an image on the basis of a result of the estimation. The light source images are image portions, in the captured image, relating to pixel groups corresponding to various types of reflected lights. The image of the retroreflecting material is an image portion, in the captured image, relating to a pixel group corresponding to the reflected light from the retroreflecting material part.

According to the above configuration example, it is possible to provide an information processing system capable of recognizing the direction to which the hand-held information processing apparatus is turned, the orientation and/or position of the hand-held information processing apparatus, etc., with a simple configuration.

In another configuration example, the information processing system may further include a specifying section that specifies the image of the retroreflecting material in the captured image on the basis of the positional information of the light source images calculated by the calculator. Further, the specifying section may calculate an interval between the light source images on the basis of the positional information of the light source images, and specify the image of the retroreflecting material on the basis of the interval between the light source images. Alternatively, the specifying section may specify the image of the retroreflecting material on the basis of a positional relationship of the light source images. Still alternatively, the specifying section may specify the image of the retroreflecting material on the basis of whether or not the positional relationship is a positional relationship in which the light source images are arrayed in a straight line.

According to the above configuration example, it is possible to detect the reflected light from the reflection member by low-load processing.

In another configuration example, the information processing system includes an imaging target member having a plurality of the retroreflecting material parts. In the imaging target member, the plurality of the retroreflecting material parts may be arranged at equal arrangement intervals. On the basis of the positional information of the positions, in the captured image, of the light source images calculated by the calculator, a plurality of sets of two light source images, each having the same interval between the two light source images, may be specified as images of the retroreflecting material corresponding to the plurality of the retroreflecting material parts included in the imaging target member.

According to the above configuration example, it is possible to detect the direction to which the hand-held information processing apparatus is turned and/or the orientation of the hand-held information processing apparatus by low-load processing while simplifying the configuration of the system.

In another configuration example, the calculator may further calculate brightnesses of the detected light source images or sizes thereof in the captured image. Further, the information processing system may include a plurality of types of imaging target members each having a plurality of the retroreflecting material parts. In each of the plurality of types of imaging target members, the retroreflecting material parts are disposed at different positions. The calculator may distinguish the types of the imaging target members on the basis of the distance between the detected light source images. The information processing system may further include a specifying section that specifies the image of the retroreflecting material in the captured image, on the basis of the brightnesses or sizes of the light source images.

According to the above configuration example, it is possible to execute information processing in which the plurality of imaging target members are property used. Further, the reflected light from the retroreflecting material part can be detected by utilizing the characteristics of the light source, thereby reducing the processing load.

In another configuration example, the image generator may generate an image including at least an indication object indicating that a position on a screen is indicated.

According to the above configuration example, when a user is operating the hand-held information processing apparatus, the user is allowed to intuitively understand the position, on the screen, corresponding to the operation.

In another configuration example, the light emitting section may emit infrared light as the light.

According to the above configuration example, viewing action of the user is not hindered. Further, even when the room is dark, the direction to which the hand-held information processing apparatus is turned and/or the orientation of the hand-held information processing apparatus can be recognized.

In another configuration example, the information processing system includes a plurality of the retroreflecting material parts, and the plurality of the retroreflecting material parts may be separately disposed in least three positions. Further, the retroreflecting material parts located in three positions may be arrayed in a straight line. In addition, the retroreflecting material parts located in three positions may be arrayed at substantially equal arrangement intervals.

According to the above configuration example, it is possible to improve the detection accuracy of the direction to which the hand-held information processing apparatus is turned and/or the orientation of the hand-held information processing apparatus, while simplifying the configuration of the system.

In another configuration example, the hand-held information processing apparatus may further include a wireless communication section that transmits the positional information of the light source images in the captured image to the information processing apparatus.

According to the above configuration example, it is possible to provide a user-friendly information processing system.

In another configuration example, the information processing system includes a flickering determining section that determines presence/absence of flickering of each light source image, on the basis of change in brightness of the light source image in the captured image over a plurality of frames. The calculator may exclude, from the processing target, a light source image that is determined by the flickering determining section to be flickering.

According to the above configuration example, the processing load on the detection process can be reduced. Further, the detection accuracy of the image of the retroreflecting material can be improved.

In another configuration example, the light emitting section may be provided at a position near the imaging section.

According to the above configuration example, the light emitted from the light emitting section can be easily and reliably captured by the imaging section.

In another configuration example, the information processing apparatus may be a stationary game machine.

According to the above configuration example, by using the hand-held information processing apparatus as an operation apparatus, for example, it is possible to provide a game system, with a simpler configuration, capable of executing game processing that utilizes motion of the operation apparatus itself.

Another configuration example is an information processing system including at least a reflection member and a hand-held information processing apparatus capable of image processing. The reflection member is a retroreflecting material part. The hand-held information processing apparatus includes an imaging section and a light emitting section. The imaging section captures an image. The light emitting section emits light. The information processing system further includes a light source detecting section, a calculator, and an image generator. The light source detecting section detects, in the image captured by the imaging section, light source images including an image of the retroreflecting material. The image of the retroreflecting material indicates light that has been emitted from the light emitting section and reflected by the retroreflecting material part. The calculator calculates positions, in the captured image, of the detected light source images. The image generator estimates an orientation or a position of the hand-held information processing apparatus on the basis of the positional information indicating the calculated positions, and generates an image on the basis of a result of the estimation.

According to the above configuration example, it is possible to provide an information processing system capable of recognizing the position and/or orientation of the hand-held information processing apparatus, with a simple configuration.

According to the present embodiment, it is possible to provide an information processing system capable of detecting the position and/or orientation of a hand-held information processing apparatus which is an operation apparatus, for example, with a simple configuration.

BRIEF DESCRIPTION OF THE DRAWINGS

FIG. 15 illustrates a non-limiting example of a distance table;

FIG. 16 illustrates a non-limiting example of a distance table after filtering;

FIG. 17 illustrates a non-limiting example of light source spots in a captured image after filtering;

DETAILED DESCRIPTION OF NON-LIMITING EXAMPLE EMBODIMENTS

Hereinafter, an exemplary embodiment will be described.

Figure 1:
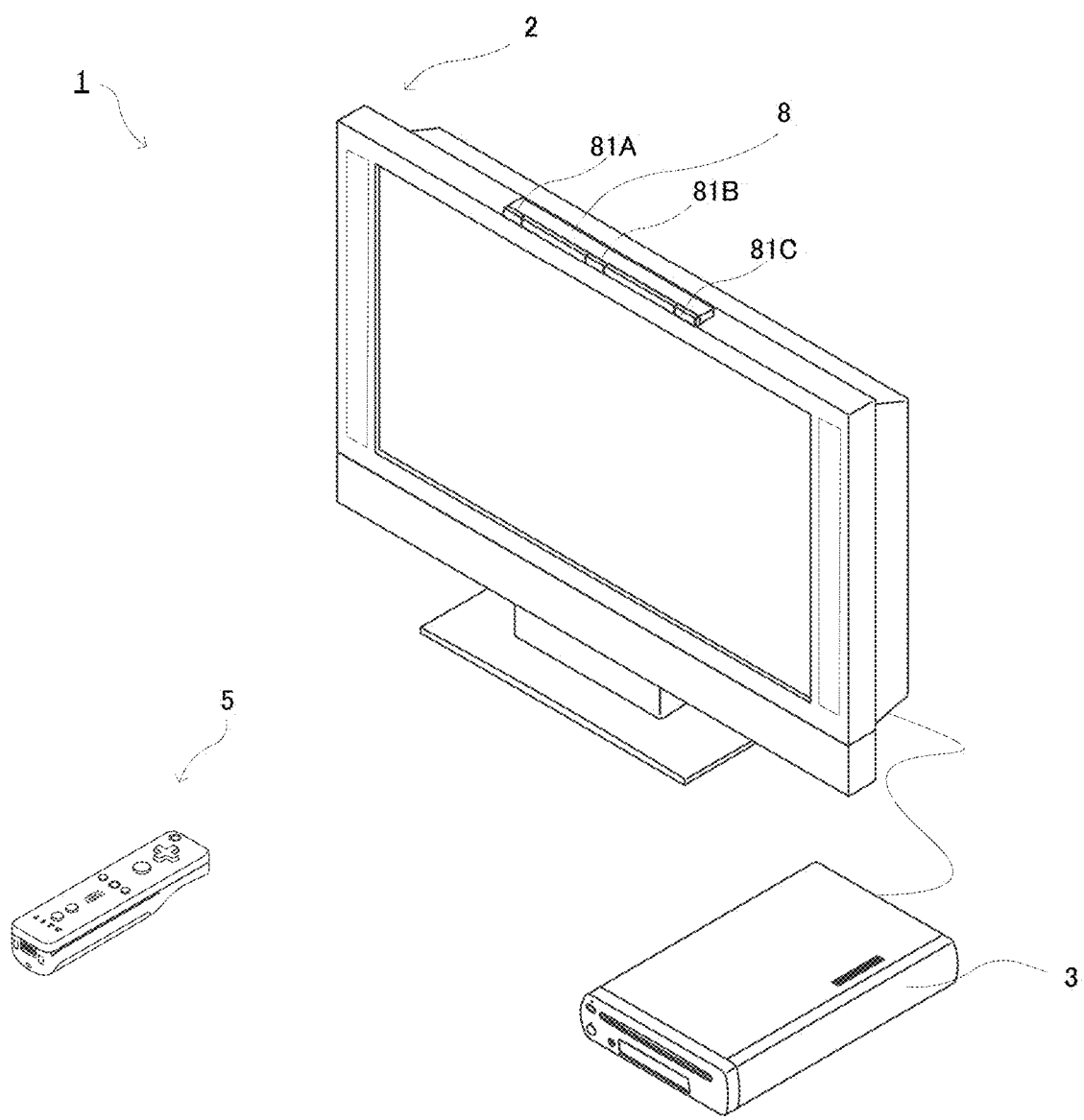
FIG. 1 is a schematic diagram illustrating the whole image of a game system which is a non-limiting example of an embodiment.

FIG. 1 is a perspective view of a game system 1 as a non-limiting example of an information processing system. In FIG. 1, the game system 1 includes: a stationary display device (hereinafter, referred to as "television") 2 typified by, for example, a television receiver; a game apparatus 3; a controller 5 as a non-limiting example of a hand-held input device; and an imaging target member 8 with a retroreflecting material (hereinafter, simply referred to as "imaging target member"). The game system 1 causes the game apparatus 3 to execute game processing on the basis of a game operation using the controller 5, and causes the television 2 to display a game image obtained in the game processing.

An optical disc (not shown), which is a non-limiting example of an information storage medium changeable with respect to the game apparatus 3, is detachably loaded into the game apparatus 3.

The television 2 is connected to the game apparatus 3 via a connection cord. The television 2 displays a game image obtained by the game processing executed in the game apparatus 3. In another embodiment, the game apparatus 3 and the stationary display device may be integrated with each other. Communication between the game apparatus 3 and the television 2 may be wireless communication.

The imaging target member 8 is provided in the vicinity of the screen of the television 2 (on the top surface of the screen in FIG. 1). A user (player) can perform a game operation of moving the controller 5. The imaging target member 8 is used by the game apparatus 3 to calculate the orientation and the like of the controller 5. The imaging target member 8 includes three retroreflecting material parts 81A to 81C (hereinafter sometimes collectively referred to as "retroreflecting material 81"). The retroreflecting material 81 is a material that reflects incident light to the incident direction of the light (the incident angle is equal to the exit angle).

Figure 2:
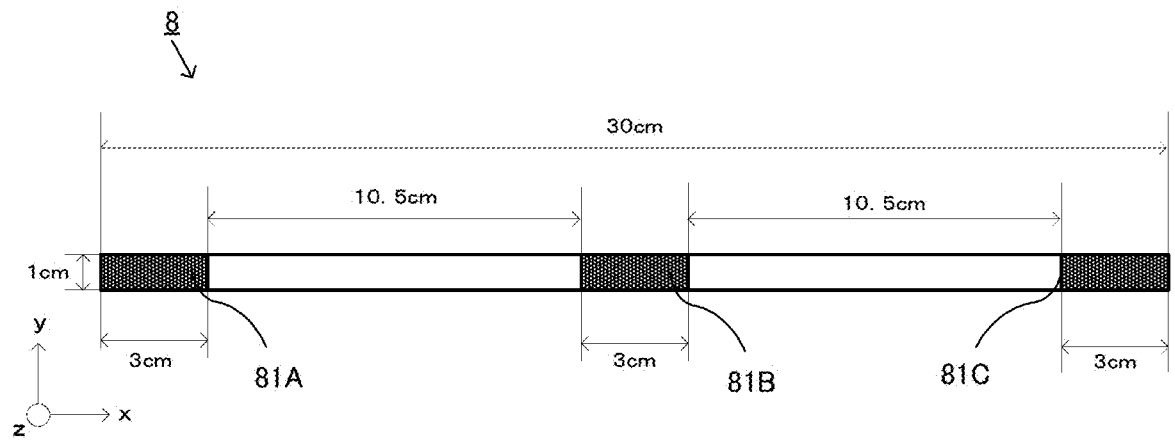
FIG. 2 is a schematic diagram when an imaging target member 8 is seen from the front.

FIG. 2 illustrates a non-limiting example of the size of the imaging target member 8 and arrangement of the retroreflecting material 81. FIG. 2 is a schematic diagram of the imaging target member 8 seen from the front. In the example of FIG. 2, the imaging target member 8 has a width (length in the x-axis direction) of 30 cm, and a height (length in the y-axis direction) of 1 cm. It is assumed that the imaging target member 8 has a depth (length in the z-axis direction) that allows the imaging target member 8 to be placed on the top surface of the screen of the television 2. The retroreflecting material part 81A is disposed at a left end of the imaging target member 8, the retroreflecting material part 81B is disposed in the center of the imaging target member 8, and the retroreflecting material part 81C is disposed at a right end of the imaging target member 8. Each retroreflecting material part 81 has a width of 3 cm. The retroreflecting material parts 81 are arranged at intervals of 10.5 cm. That is, the retroreflecting material parts 81 are arranged at regular intervals. It can be said that the three retroreflecting material parts 81 have the same size.

The arrangement interval and the size shown in FIG. 2 are merely examples, and the present disclosure is not limited thereto. Other arrangement intervals and other sizes may be adopted.

The controller 5 provides the game apparatus 3 with operation data representing the content of an operation performed on the controller 5. The controller 5 and the game apparatus 3 are wirelessly communicable with each other. In the present embodiment, for example, the Bluetooth (registered trademark) technology is used for wireless communication between the controller 5 and the game apparatus 3. In another embodiment, the controller 5 and the game apparatus 3 may be connected with each other by a wired connection. In addition, the game apparatus 3 is communicable with a plurality of controllers, and therefore a plurality of players can play a game using a predetermined number of controllers 5 simultaneously. In the present embodiment, the controller 5 is operated by using a battery as a power source.

In the present embodiment, an infrared light emitting section (IR-LED in this embodiment) and an infrared camera are provided at a front surface (front end side) of the controller 5. Therefore, when the front surface of the controller 5 is turned to the imaging target member 8, infrared light is applied to the imaging target member 8. As a result, the infrared light emitted from the infrared light emitting section is reflected by the retroreflecting material 81. Therefore, in an image obtained by capturing the infrared light with the infrared camera, reflected light from the retroreflecting material 81 is projected (for example, the reflected light is projected as three light spots having high luminances). Accordingly, by analyzing the capture image to specify (detect) the reflected light from the retroreflecting material in the captured image and then calculating the position and the like of the reflected light in the captured image, the direction (indication direction) to which the front surface of the controller 5 is turned and/or the orientation of the controller 5 can be recognized (as the direction, orientation, or the like relative to the retroreflecting material 81).

In the present embodiment, the number of the retroreflecting material parts 81 arranged in the imaging target member 8 is three, which is determined in consideration of balance between analytic precision and processing load in the analysis process for specifying the reflected light from the retroreflecting material parts 81. That is, if the number of the retroreflecting material parts 81 is too few, detection accuracy of the reflected light from the retroreflecting material parts 81 might be reduced when, for example, the amount of noise light described later is great. If the number of the retroreflecting material parts 81 is too many, processing load on the analysis process might be increased. In terms of keeping balance between the detection accuracy and the processing load, three retroreflecting material parts 81 are provided in the present embodiment. In another embodiment, however, the number of the retroreflecting material parts 81 included in the imaging target member 8 may be one or two (if conditions for ensuring sufficient detection accuracy or the like are satisfied). On the other hand, if sufficient arithmetic processing capability is expected, four or more retroreflecting material parts 81 may be provided.

Figure 3:
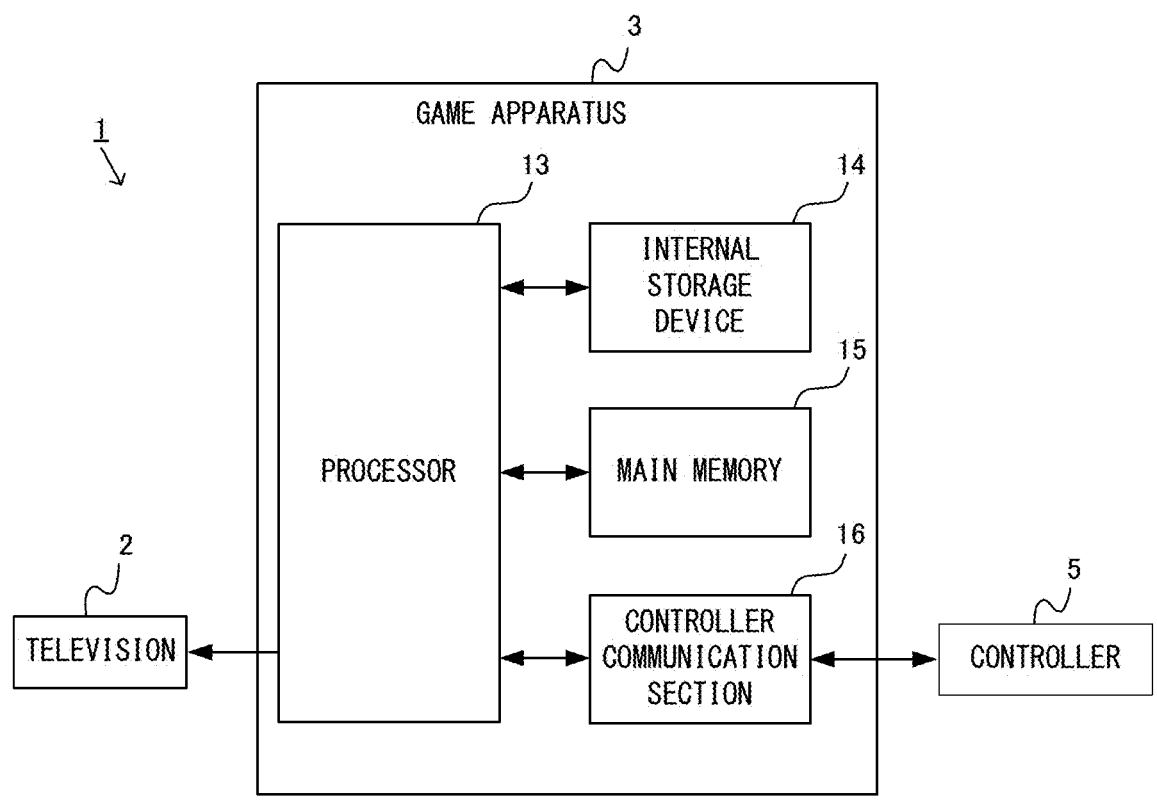
FIG. 3 is a block diagram of a game apparatus 3.

Next, the internal structure of the game apparatus 3 will be described. FIG. 3 is a block diagram of the game apparatus 3. In FIG. 3, the game apparatus 3 includes a processor 13, an internal storage device 14, a main memory 15, and a controller communication section 16. The processor 13 performs various controls for the game apparatus 3. In addition, the processor 13 receives, via the controller communication section 16, various data transmitted from the controller 5, and executes information processing based on the various data. The controller communication section 16 is, for example, a Bluetooth chip. A computer program to be executed by the processor 13 is stored in the internal storage device 14. The internal storage device 14 is typically a flash EEPROM. The main memory 15 temporarily stores computer programs and information therein.

Regarding the processor 13 of the game apparatus 3, later-described processing may be performed by a single processor 13, or a plurality of processors 13 may be provided in the single game apparatus 3, and the processing may be performed by using the plurality of processors 13 in combination.

Figure 4:
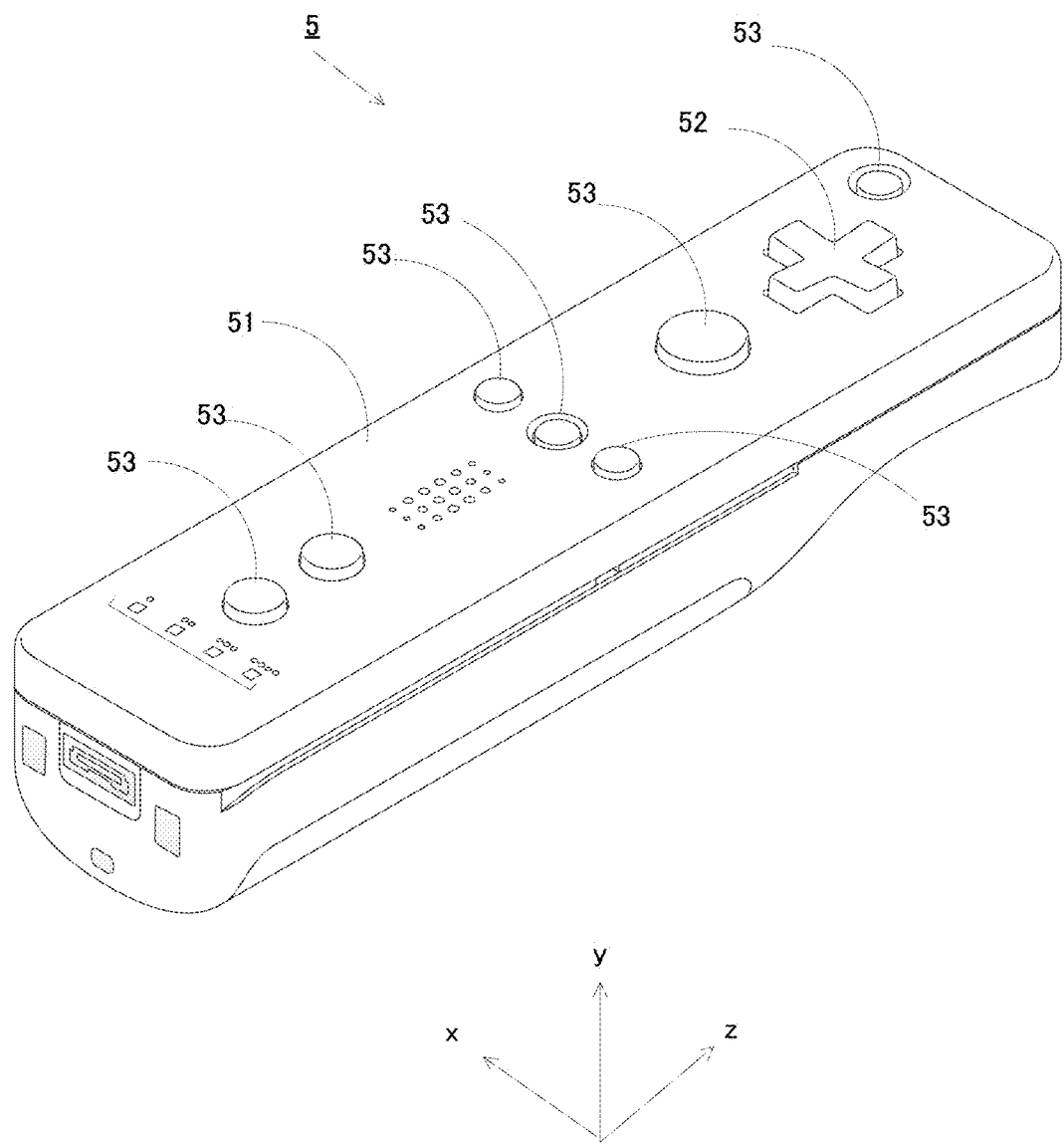
FIG. 4 is a perspective view illustrating an external configuration of a controller 5.

Next, the controller 5 will be described. FIG. 4 is a perspective view illustrating the external configuration of the controller 5. In FIG. 4, the controller 5 includes a housing 51 formed by plastic molding. The housing 51 has a substantially parallelepiped shape extending in its longitudinal direction from front to rear (the z-axis direction shown in FIG. 4). The entire housing 51 can be held with one hand by an adult or even a child. The controller 5, as an operation section, includes a cross key 52, a plurality of operation buttons 53, etc. The controller 5 also includes a motion sensor. A user can perform a game operation by pressing the buttons provided on the controller 5, and moving the controller 5 per se to change the position and/or orientation (tilt) thereof.

Figure 5:
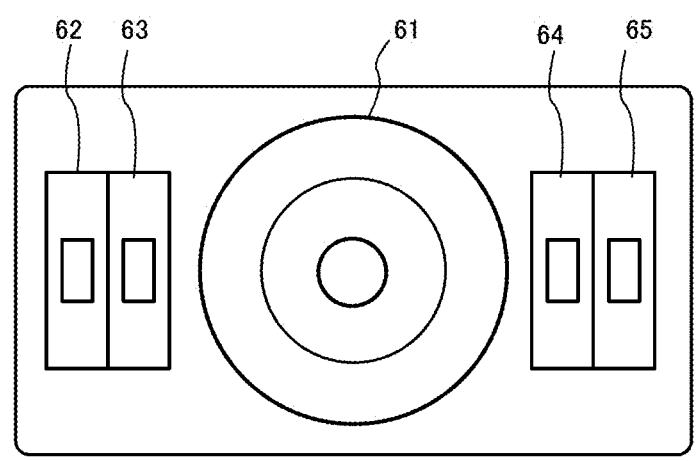
FIG. 5 is a schematic diagram illustrating a front surface of a housing 51.

On a front surface of the housing 51, an infrared camera and four infrared light emitting sections are provided. FIG. 5 is a schematic diagram illustrating the front surface of the housing 51. In FIG. 5, an infrared camera 61 (more specifically, a light incident surface thereof) is provided. In the present embodiment, an angle of view of the infrared camera is 120°. (In the present embodiment, "angle of view" signifies "diagonal angle of view".)

Further, in FIG. 5, in a region to the left of the infrared camera 61, a first infrared light emitting section 62 and a second infrared light emitting section 63 are disposed. In addition, in a region to the right of the infrared camera 61 in FIG. 5, a third infrared light emitting section 64 and a fourth infrared light emitting section 65 are disposed. That is, four infrared light emitting sections are disposed at right and left neighboring positions around the infrared camera 61 (in this example, two on the left side and two on the right side). The amount of light emitted from the first infrared light emitting section 62 and the second infrared light emitting section 63 is the same as that emitted from the third infrared light emitting section 64 and the fourth infrared light emitting section 65, but the half-power angle (an angle at which the amount of light is halved as compared to that when light is emitted frontward, and which is also called an entrance angle) of the first infrared light emitting section 62 and the second infrared light emitting section 63 is different from that of the third infrared light emitting section 64 and the fourth infrared light emitting section 65. Specifically, the half-power angle of the first infrared light emitting section 62 and the second infrared light emitting section 63 is 130°, while the half-power angle of the third infrared light emitting section 64 and the fourth infrared light emitting section 65 is 75°. Since the angle of view of the infrared camera is 120° as described above, the first infrared light emitting section 62 and the second infrared light emitting section 63 having the half-power angle greater than or equal to the angle of view of the infrared camera 61 are used. In addition, the third infrared light emitting section 64 and the fourth infrared light emitting section 65 having the half-power angle less than the angle of view of the infrared camera is used.

In the following description, the first infrared light emitting section 62 and the second infrared light emitting section 63 are sometimes collectively referred to as "130° light emitting section" while the third infrared light emitting section 64 and the fourth infrared light emitting section 65 are sometimes collectively referred to as "75° light emitting section".

The positional relationship between the infrared camera 61 and the infrared light emitting sections is not limited to that shown in FIG. 5. The infrared camera 61 and the infrared light emitting sections may be disposed at any positions as long as the infrared light can be applied to the imaging target member 8 (retroreflecting material 81) and the reflected light thereof can be captured (imaged). For example, the infrared light emitting sections may be disposed above and below the infrared camera 61.

Figure 6:
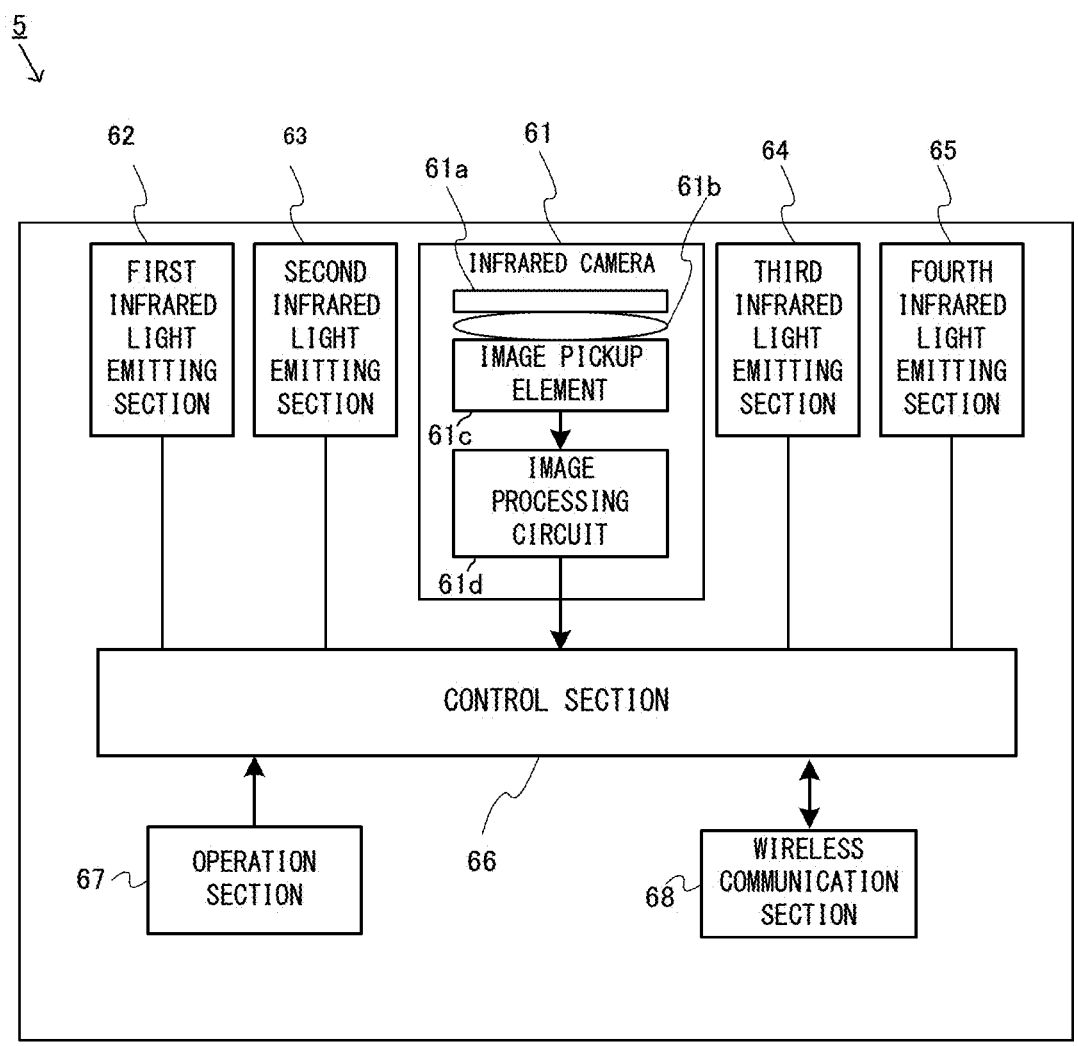
FIG. 6 is a block diagram illustrating an internal configuration of the controller 5.

Next, the internal configuration of the controller 5 will be described. FIG. 6 is a block diagram illustrating the internal configuration of the controller 5. The controller 5 includes the infrared camera 61, the first infrared light emitting section 62, the second infrared light emitting section 63, the third infrared light emitting section 64, the fourth infrared light emitting section 65, a control section 66, an operation section 67 (various operation buttons), and a wireless communication section 68. The controller 5 transmits data representing the content of an operation performed on the controller 5, as operation data, to the game apparatus 3.

The control section 66 controls the operation in the controller 5. Specifically, the control section 66 receives output data from the respective input sections (the operation section 67 and the infrared camera 61), and transmits these data as operation data to the game apparatus 3 through the wireless communication section 68. In addition, the control section 66 receives, from the game apparatus 3, data including a predetermined control instruction, and performs ON/OFF control for the first infrared light emitting section 62, the second infrared light emitting section 63, the third infrared light emitting section 64, and the fourth infrared light emitting section 65 on the basis of the control instruction. Furthermore, the control section 66 performs operation control for the controller 5 (e.g., power supply control). In other words, the control section 66 has the function of controlling the controller 5, and in that sense, the controller 5 is a type of a hand-held information processing apparatus.

In the present embodiment, wireless communication is performed between the controller 5 and the game apparatus 3. In another embodiment, communication may be performed therebetween via a wire.

Each of the first infrared light emitting section 62, the second infrared light emitting section 63, the third infrared light emitting section 64, and the fourth infrared light emitting section 65 emits infrared light on the basis of control by the control section 66. As described above, the half-power angle of the first infrared light emitting section 62 and the second infrared light emitting section 63 is 130°, while the half-power angle of the third infrared light emitting section 64 and the fourth infrared light emitting section 65 is 75°.

The infrared camera 61 includes an infrared filter 61a, a lens 61b, an image pickup element 61c, and an image processing circuit 61d (hardware engine). The infrared filter 61a allows only infrared light to pass therethrough, among lights incident on the front surface of the controller 5. The lens 61b collects the infrared light that has passed through the infrared filter 61a, and causes the collected infrared light to enter the image pickup element 61c. The image pickup element 61c is a solid-state image pickup element such as a CMOS sensor or a CCD sensor, and receives the infrared light collected by the lens 61b to output an image signal.

The imaging target member 8 as a target of imaging is provided with the retroreflecting material 81 as described above. Therefore, infrared lights emitted from the first to fourth infrared light emitting sections 62 to 65 are reflected by the retroreflecting material 81 and applied to the infrared camera 61 as reflected light. Since the infrared filter 61a is provided, the image pickup element 61c receives only the infrared lights that have passed through the infrared filter 61a to generate image data. In the following description, the image captured by the image pickup element 61c is referred to as a captured image. In addition, portions, corresponding to the infrared lights, which appear in the captured image (images of the infrared lights, images of the light sources) are referred to as light source spots.

The image data generated by the image pickup element 61c is processed in the image processing circuit 61d. The image processing circuit 61d calculates the positions, sizes, and luminances of light source spots in the captured image. The light source spots that appear in the captured image also include infrared light other than the reflected light from the retroreflecting material 81. In the following description, an image, relating to the light source spot, other than the reflected light from the retroreflecting material 81 is referred to as "noise light". In addition, an image relating to three light source spots corresponding to the reflected light from the retroreflecting material parts 81A, 81B, and 81C is referred to as "imaging target member reflected light". The image processing circuit 61d performs, for example, a process of eliminating such noise light, and performs a process of specifying the imaging target member reflected light. Then, the image processing circuit 61d outputs, to the control section 66, coordinates indicating the position of the specified imaging target member reflected light, information indicating the magnitude of the imaging target member reflected light, and information indicating the luminance of the imaging target member reflected light. These data are transmitted by the control section 66 to the game apparatus 3 as a part of the operation data. In the following description, the above data is referred to as "imaging target member information".

Next, the outline of the processing according to the present embodiment will be described. As described above, when the front surface of the controller 5 is turned to the imaging target member 8, the infrared light emitted from the controller 5 is reflected at the retroreflecting material 81. Then, the image obtained by capturing the infrared light with the infrared camera is analyzed, and the reflected light from the retroreflecting material in the captured image is detected, whereby the position, in the captured image, where the imaging target member 8 is present can be estimated. Then, the imaging target member information about the imaging target member reflected light is transmitted to the game apparatus 3. In the game apparatus 3, on the basis of the imaging target member information, a process of recognizing the indication direction of the controller 5, the orientation of the controller 5, and the like is performed. Further, for example, on the basis of the indication direction, for example, a process of controlling movement of a cursor or a pointer for indicating a position in the screen is performed.

Figure 7:
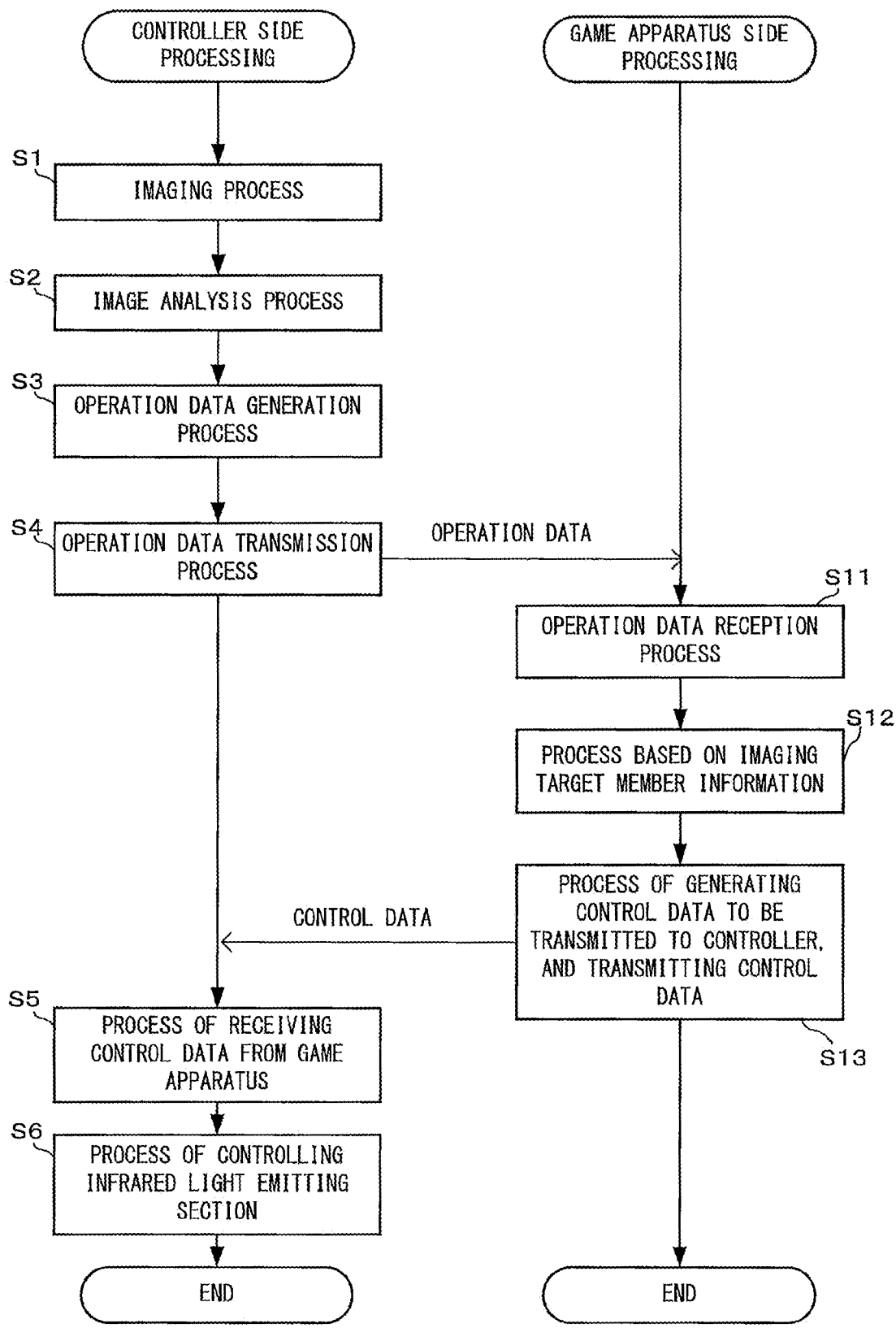
FIG. 7 is a flowchart illustrating a non-limiting example of a control process according to the present embodiment.

Next, the above control process will be described in detail. FIG. 7 is a flowchart illustrating a non-limiting example of the control process according to the present embodiment. In FIG. 7, a flowchart of controller-side processing is shown on the left side, while a flowchart of game apparatus-side processing is shown on the right side. The processing of this flowchart is repeatedly executed in predetermined cycles (e.g., 1/60 sec).

First, in step S1, the infrared camera 61 performs an imaging process on the basis of an instruction from the control section 66 of the controller 5. That is, a process of generating a captured image is executed by means of the image pickup element 61c.

Next, in step S2, the image processing circuit 61d in the infrared camera 61 executes a process of analyzing the captured image. In this process, the following processes are mainly executed. First, a process of detecting light source spots from the captured image is executed. Next, a process of excluding the noise light from the detected light source spots to specify imaging target member reflected light is executed (imaging target member reflected light appears as linearly-arrayed three light source spots). Further, a process of calculating the position (coordinates), magnitude, and luminance of the imaging target member reflected light in the captured image to generate the imaging target member information is executed. Then, the imaging target member information is outputted from the image processing circuit 61d to the control section 66.

Figure 8:
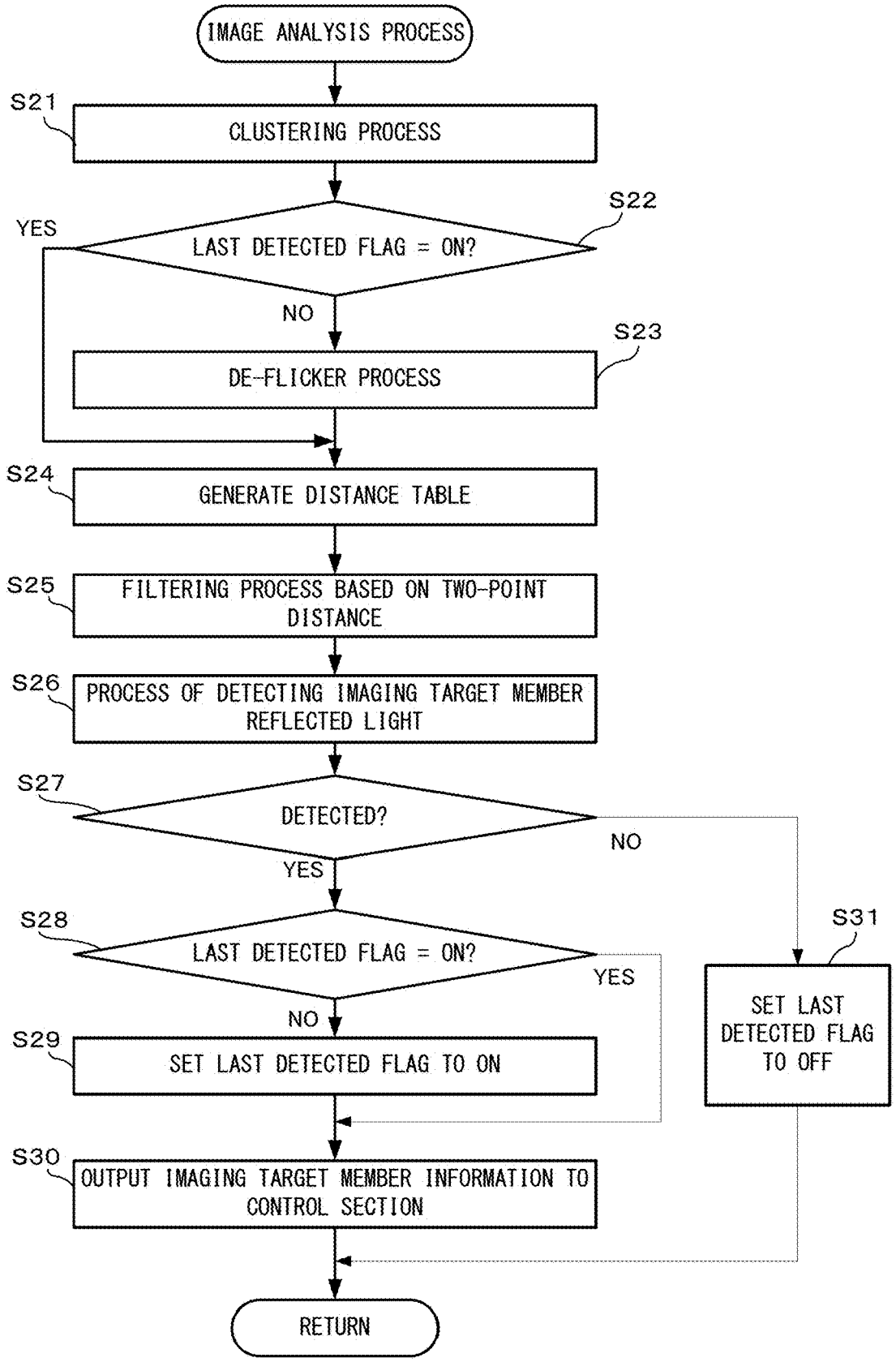
FIG. 8 is a flowchart illustrating an analysis process for a captured image in detail.
Figure 9:
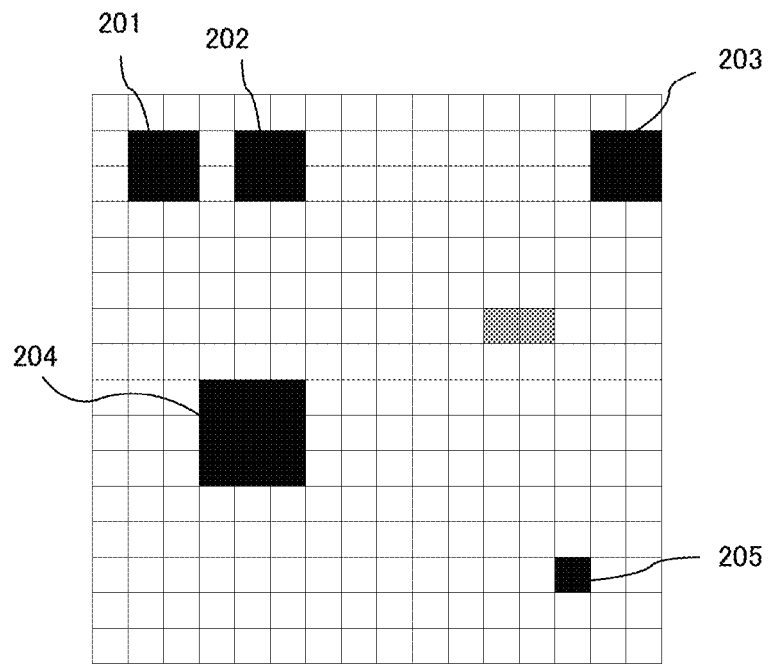
FIG. 9 illustrates a non-limiting example of a captured image.

FIG. 8 is a flowchart illustrating the process of analyzing the captured image (hereinafter referred to as an image analysis process) in detail. First, in step S21, a clustering process is executed. This process is for detecting light source spots that appear in the captured image (for calculating the coordinates of the positions of the light source spots). Specifically, the following process is executed. First, a schematic diagram illustrating a part of the captured image is shown in FIG. 9. In FIG. 9, each square corresponds to one pixel. Further, in FIG. 9, a base (background) is shown in white, and incident lights (candidates for light source spots) are shown in black and gray. The image processing circuit 61d performs pixel by pixel scanning on the captured image as shown in FIG. 9 to find light source spots (in the present embodiment, the scanning is started from an upper left corner of the captured image and proceeds in the horizontal direction). First, the image processing circuit 61d detects pixels each having a luminance value greater than or equal to a predetermined threshold (hereinafter referred to as a luminance threshold). In FIG. 9, black pixels satisfy the above condition, and gray pixels have luminance values less than the luminance threshold. Subsequently, the image processing circuit 61d specifies groups of pixels which have luminance values greater than or equal to the luminance threshold and are adjacent to each other. Then, the image processing circuit 61d specifies, among the specified pixel groups, pixel groups the sizes of which are within a range of predetermined thresholds. In the present embodiment, for example, pixel groups the sizes of which are within a range from 2×2 pixels (hereinafter referred to as a lower-limit size threshold) to 4×4 pixels (hereinafter referred to as an upper-limit size threshold) are specified. As a result, in FIG. 9, pixel groups 201, 202, 203, and 204 are specified as the pixel groups that satisfy the above condition. Regarding a pixel 205, the luminance thereof is greater than or equal to the luminance threshold, but the size thereof does not satisfy the above condition. Therefore, the pixel 205 is not specified as a pixel group that satisfies the above condition. The above-described thresholds are set in a register (not shown) in the image processing circuit 61*d*, for example. Further, the specific values of the respective thresholds are merely examples. In another embodiment, other threshold values may be appropriately set as threshold values suitable for utilization circumstances.

Figure 10:
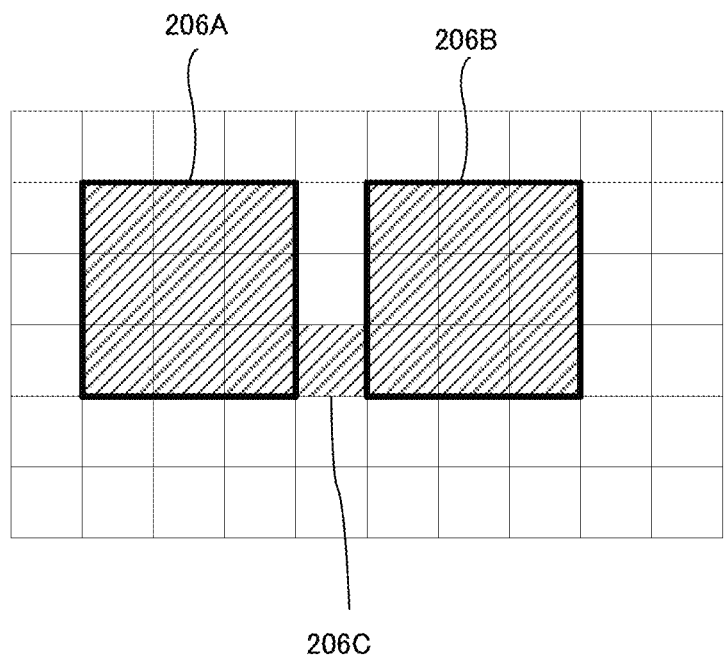
FIG. 10 illustrates a method for detecting light source spots.
Figure 11:
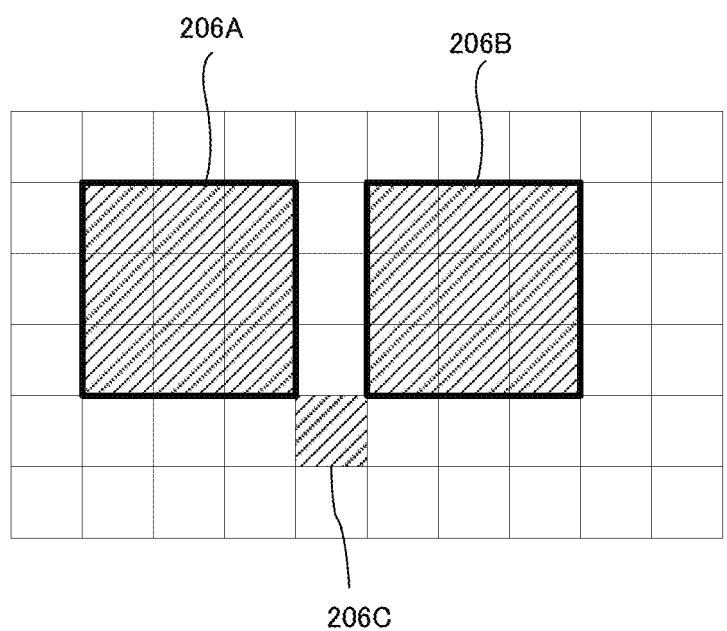
FIG. 11 illustrates a method for detecting light source spots.

Further, the image processing circuit 61*d* also performs a process of lumping together pixel groups which are close to some extent, among the specified pixel groups. The outline of this process will be described with reference to FIG. 10. FIG. 10 shows two pixel groups each having a size of vertical 3 pixels×horizontal 3 pixels. In FIG. 10, a single pixel 206C having a luminance greater than or equal to the luminance threshold value is present on the right side of a pixel located in the lower right of a first pixel group 206A and on the left side of a pixel located in the lower left of a second pixel group 206B (i.e., the single pixel 206C is present between these pixels). In other words, the first pixel group 206A and the second pixel group 206B are connected to each other due to the presence of the pixel 206C. Thus, when continuation of pixels each having a luminance greater than or equal to the luminance threshold value is not completely broken, so to speak, when two (or more) pixel groups are detected so as to be connected to each other at portions thereof, these two pixel groups can be detected, in a lump, as a single "light source spot". In the example of FIG. 10, the two pixel groups are treated as a light source spot having a size of vertical 3 pixels×horizontal 7 pixels. In the present embodiment, regarding the state in which a plurality of pixel groups are connected at portions thereof, a state as shown in FIG. 11 is also included. In FIG. 11, the pixel 206C is present at a position in the lower right of the pixel located in the lower right of the first pixel group 206A and in the lower left of the pixel located in the lower left of the second pixel group 206B. In this way, as long as the pixel 206C is present at a position where the perimeter, corresponding to one pixel, of the first pixel group 206A overlaps the perimeter, corresponding to one pixel, of the second pixel group 206B, these two pixel groups are detected as a single "light source spot". That is, when presence of a pixel having a luminance greater than or equal to the predetermined luminance threshold value is recognized at a position included in the perimeter, corresponding to one pixel, of the first pixel group 206A and in the perimeter, corresponding to one pixel, of the second pixel group 206B, these two pixel groups are treated as a single "light source spot". In the case of FIG. 11, the two pixel groups are treated as a light source spot having a size of vertical 3 pixels×horizontal 7 pixels, or as a light source spot having a size of vertical 4 pixels× horizontal 7 pixels (the size of the light source spot may be appropriately determined on the basis of, for example, the specific content of a process in which the light source spot is used).

Figure 12:
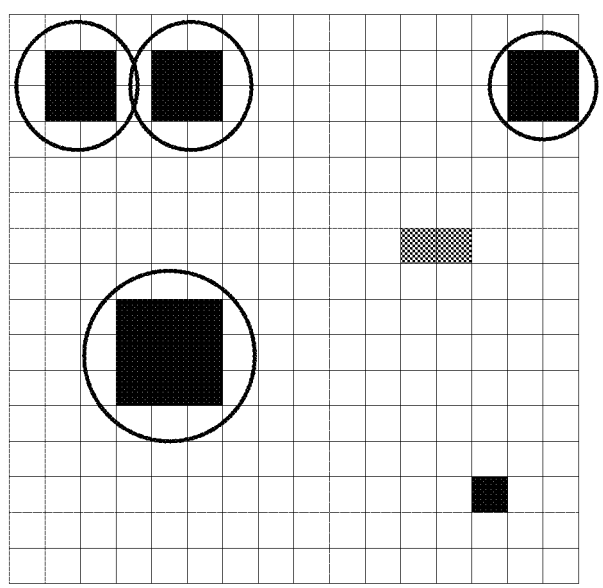
FIG. 12 illustrates a non-limiting example of light source spots in a captured image.

FIG. 12 shows light source spots detected as a result of the above process. In FIG. 12, each pixel group enclosed in a circle or an oval is a single light source spot. That is, FIG. 12 shows that a total of four light source spots are detected. In FIG. 12, two light source spots in the upper left corner are each treated in the following process as a light source spot having a size of vertical 2 pixels×horizontal 2 pixels. In addition, a light source spot in the upper right corner is treated as a light source spot having a size of vertical 2 pixels×horizontal 2 pixels. A light source spot in the lower left portion is treated as a light source spot having a size of vertical 3 pixels×horizontal 3 pixels.

Figures 13, 14:
FIG. 13 illustrates a non-limiting example of a structure of light source spot data.
FIG. 14 illustrates a non-limiting example of light source spots in a captured image.

Then, data representing the positions, sizes, and luminances, in the captured image, of the light source spots detected as described above are temporarily stored as light source spot data in the register in the image processing circuit 61*d*, for example. FIG. 13 shows a non-limiting example of the structure of the light source spot data. In FIG. 13, the light source spot data are data of a table structure having items of "identification No.", "position coordinates", "size", and "luminance". The position coordinates may be coordinates, in the captured image, indicating an upper right portion of each corresponding light source spot, or coordinates indicating a midpoint of each light source spot. In the present embodiment, the position coordinates are midpoint coordinates. In addition, data of any form may be adopted as long as the data indicates a position in the captured image. The "size" may also be indicated in any form as long as it is data indicating the size of the corresponding light source spot.

Referring back to FIG. 8, in step S22, the image processing circuit 61*d* determines whether or not a last detected flag is set to ON. The last detected flag is a flag stored in the register in the image processing circuit 61*d*. The last detected flag is a flag indicating whether or not the imaging target member 8 has been in the detected state in the process for the immediately preceding frame (in the last processing loop). When the imaging target member 8 has been detected in the immediately preceding frame, the last detected flag is set to ON; otherwise, the last detected flag is set to OFF (an initial value is set to OFF). When the result of the determination is that the last detected flag is OFF (NO in step S22), the image processing circuit 61*d* executes a de-flicker process in step S23. This process is a process for eliminating noise due to flicker (flickering light source spot) from the processing target. Specifically, the following process is executed. For each of the detected light source spots, images corresponding to a few frames (at least two frames) are compared. If the frames have significantly different luminances, the light source spot is determined to be flickering, and excluded from the processing target. For example, in the case where images corresponding to two frames of a certain light source spot are compared, and one of the two frames has a luminance exceeding the luminance threshold value while the other frame has a luminance of 0, it is determined that this light source spot is flickering. Then, the light source spot is deleted from the light source spot data to be excluded from the processing target.

The de-flicker process is not limited to the above-described process, and may be any process as long as the process can exclude a light source spot which is determined to be flickering.

On the other hand, when the last detected flag is ON (YES in step S22), the process in step S23 is skipped and a process in subsequent step S24 is executed.

In step S24, the image processing circuit 61*d* executes a process of generating a distance table. The distance table is data indicating a distance between two points for all the light source spots detected through the clustering process and the de-flicker process, and is temporarily stored in the register of the image processing circuit 61*d*, for example. FIG. 14 shows a non-limiting example of the light source spots (captured image) detected through the clustering process and the de-flicker process. FIG. 15 shows a non-limiting example of a distance table generated on the basis of the light source spots shown in FIG. 14. The distance table is data of a table structure having two items of "combination" and "two-point distance". The "combination" indicates a combination of any two of the light source spots. The "two-point distance" indicates a distance between the two light source spots. In the present embodiment, the distance is a direct distance from the midpoint of one of the two light source spots to the midpoint of the other light source spot. In FIG. 13, "1-2" indicates a combination of the first light source spot and the second light source spot.

FIG. 14 indicates that, in a captured image 300, seven light source spots are detected. Therefore, the distance table shown in FIG. 15 contains all combinations of two light source spots derived from the seven light source spots, that is, combinations from "1-2" to "6-7". Then, for each combination, the distance between the two light source points is calculated and stored.

Referring back to FIG. 8, in step S25, the image processing circuit 61d executes a filtering process based on the distance between two points. This process is a process of deleting, from the distance table, data of a combination the two-point distance of which exceeds a predetermined threshold value. That is, a combination the two-point distance of which is too long is excluded from the processing target. In the present embodiment, as for the threshold value regarding the two-point distance, a value assuming the distance between the retroreflecting material parts 81 of the imaging target member 8 is set in advance. In this embodiment, data of a combination the two-point distance of which exceeds "200" is deleted from the distance table. As a result, the distance table after the filtering process has the content as shown in FIG. 16. In FIG. 16, four combinations remain. In the example of FIG. 16, the seventh light source spot shown in FIG. 14 has been excluded as the result of the filtering process. Therefore, the image of the light source spots in the captured image after the filtering process is as shown in FIG. 17.

Referring back to the FIG. 8, in step S26, the image processing circuit 61d executes a process of detecting (specifying) three light source spots corresponding to the imaging target member reflected light on the basis of the distance table. Specifically, the image processing circuit 61d selects three light source spots to be candidates for the imaging target member reflected light, and determines whether or not the distances among the three light source spots satisfy the later-described distance relationship. Then, a process of, for example, determining whether or not the three light source spots are linearly arrayed is executed. More specifically, first, combinations the two-point distances of which are less than or equal to a predetermined value are extracted. Next, any one of the extracted combinations is selected (hereinafter this combination is referred to as a first combination). Next, a combination (second combination) is selected, which is another combination including one of the light source spots constituting the selected first combination and has a two-point distance less than or equal to the predetermined value (if there are a plurality of such combinations, any one of them is selected). Thus, three light source spots to be the candidates for the imaging target member reflected light are obtained (three light source spots indicated by the first combination and the second combination). Then, the three candidate light source spots are subjected to the following processes. First, the distances among the three light source spots are calculated. For example, a distance L1 between the first light source spot and the second light source spot, a distance L2 between the second light source spot and the third light source spot, and a distance L3 between the first light source spot and the third light source spot are calculated. Then, it is determined whether or not the relationship among the distances L1, L2, and L3 satisfies a predetermined condition. For example, it is determined whether or not a condition that any two of the distances L1, L2, and L3 are equal to or substantially equal to each other and the remaining one distance is equal to or substantially equal to a distance obtained by adding the other two distances, is satisfied. That is, it is determined whether or not the three light source spots are arranged at equal intervals (in another embodiment, the distance L3 may be omitted, and whether or not the distances L1 and L2 are equal to or substantially equal to each other may be determined). If the above condition is satisfied, two straight lines, i.e., a straight line connecting the first light source spot and the second light source spot and a straight line connecting the second light source spot and the third light source spot are calculated, and on the basis of the two straight lines, it is determined whether or not the three candidate light source spots are linearly arrayed. For example, this determination is made on the basis of, for example, whether or not an angle formed by the two straight lines is 0° or substantially 0°. When the result of the determination is that the three candidate light source spots are linearly arrayed, the combination of the three light source spots is specified as the imaging target member reflected light.

The processes as described above are performed on all the light source spots included in the distance table. If a plurality of sets of light source spots that satisfy the condition for the imaging target member reflected light have been detected, the first detected set is adopted. This is because the imaging target member 8 is disposed above the television 2 in the present embodiment. Therefore, if the imaging target member 8 is disposed beneath the television 2 in another embodiment, a set of three light source spots detected last may be adopted. Whether the imaging target member 8 is disposed above or beneath the television 2 may be set on a setting screen of a game machine body and stored as setting data in the game machine body, for example. In the detection process, by using this data, switching may be performed between a detection mode in which the first detected imaging target member reflected light is adopted and a detection mode in which the last detected imaging target member reflected light is adopted.

The above-described process of detecting the imaging target member reflected light is a non-limiting example, and any process may be used as long as the process can determine linearity of arrangement of three light source spots, and determine whether or not the three light source spots are arranged at equal or substantially equal intervals. For example, the following process may be used. First, the image processing circuit 61d selects one of combinations, of two light source spots, remaining on the distance table. Next, the image processing circuit 61d calculates a first straight line connecting the two light source spots of the selected combination, i.e., connecting the midpoints of the first light source spot and the second light source spot. Next, the image processing circuit 61d determines whether or not another light source spot is present on the extension of the first straight line. At this time, presence of such another light source spot may be confirmed on either the extension in the forward direction or the extension in the opposite direction. When the result of the determination is that a light source spot is present on the extension, the image processing circuit 61d regards the light source spot as the third light source spot, and calculates a second straight line connecting the midpoints of the second light source spot and the third light source spot. Then, the image processing circuit 61d determines whether or not the length of the first straight line is equal to the length of the second straight line or a difference of the lengths, which are not exactly equal to each other, is within a range that allows the lengths to be regarded as being substantially equal to each other. When the result of the determination is that the lengths of the first straight line and the second straight line are equal or substantially equal to each other, the image processing circuit 61d specifies the combination of the three light source spots as the imaging target member reflected light.

Next, in step S27, the image processing circuit 61d determines whether or not the imaging target member reflected light has been detected as the result of the process in step S26. When the result of the determination is that no imaging target member reflected light has been detected (NO in step S27), the image processing circuit 61d, in step S31, sets the last detected flag to OFF, and thereafter, the image analysis process is ended. On the other hand, when the imaging target member reflected light has been detected (YES in step S27), the image processing circuit 61d, in step S28, determines whether or not the last detected flag is ON. When the result of the determination is that the last detected flag is not ON (NO in step S28), the image processing circuit 61d, in step S29, sets the last detected flag to ON, and thereafter, proceeds to step S30. On the other hand, when the last detected flag has already been ON (YES in step S28), the process in step S29 is skipped.

Next, in step S30, the image processing circuit 61d outputs, to the control section 66, information relating to the detected imaging target member reflected light, i.e., the imaging target member information. Specifically, the image processing circuit 61d outputs, to the control section 66, information indicating the positions, sizes, and luminances of the three light source spots constituting the detected imaging target member reflected light, as the imaging target member information. This is the end of the image analysis process.

Referring back to FIG. 7, in step S3, the control section 66 executes a process of generating operation data including the imaging target member information. In the subsequent step S4, the control section 66 executes a process of transmitting the operation data to the game apparatus 3.

Now, the process on the game apparatus 3 side will be described. In step S11, the processor 13 of the game apparatus 3 executes a process of receiving the operation data transmitted from the controller 5.

Next, in step S12, the processor 13 executes a predetermined process based on the imaging target member information. For example, the processor 13 executes a process of estimating the direction of the controller 5 on the basis of the imaging target member information, and controlling the cursor on the screen on the basis of the estimation result. Alternatively, for example, the processor 13 may perform a process of calculating the tilt (orientation) of the controller 5 on the basis of the imaging target member information, and causing a game object to move on the basis of the tilt. In the present embodiment, the processor 13 executes a process of calculating the distance between the controller 5 and the imaging target member 8 on the basis of the imaging target member information. For example, the distance is calculated on the basis of the intervals among the three light source spots of the imaging target member reflected light, or the sizes of the respective light source spots.

Next, in step S13, the processor 13 executes a process of forming control data to be transmitted to the controller 5. This control data includes instruction information for instructing ON/OFF switching of the infrared light emitting sections 62 to 65 of the controller 5 on the basis of the calculated distance. The processor 13 transmits the control data to the controller 5. This is the end of the process on the game apparatus side.

Returning back to the process on the controller 5 side, in step S5, the control section 66 executes a process of receiving the control data from the game apparatus 3.

Next, in step S6, the control section 66 executes ON/OFF control for the infrared light emitting sections 62 to 65 on the basis of the control data. In this process, the following control is performed. As described above, two types of infrared light emitting sections (the 130° light emitting section and the 75° light emitting section) having different half-power angles are provided on the front surface of the controller 5. Since the amounts of light of the four infrared light emitting sections 62 to 65 are equal to each other, the infrared light from the 75° light emitting section is delivered farther than the infrared light from the 130° light emitting section. By utilizing this feature, in the present embodiment, control to switch ON/OFF of the two types of infrared light emitting sections according to a situation is performed. Specifically, when infrared light (including reflected light) from a position apart by a predetermined distance or more from the controller 5 is desired to be recognized (hereinafter referred to as long distance recognition), all the four infrared light emitting sections are turned ON. On the other hand, when it is enough to recognize only infrared light from a position apart by less than the predetermined distance from the controller 5, i.e., from a relatively near position (hereinafter referred to as short distance recognition), control is performed to turn on the 130° light emitting section and turn off the 75° light emitting section. For example, in the situation where the distance between the imaging target member 8 and the controller 5 is greater than or equal to the predetermined distance, all the four infrared light emitting sections 62 to 65 are turned ON. On the other hand, in the situation where the distance between the imaging target member 8 and the controller 5 is less than the predetermined distance, only the 130° light emitting section is turned ON (since the half-power angle of the 130° light emitting section is wider than the angle of view of the infrared camera as described above, the light from the infrared camera is not missed). Further, in another example, a case is assumed in which, during progress of game processing, a situation that the imaging target member 8 at a position apart by a predetermined distance or more is desired to be recognized (long distance recognition) and a situation that although the imaging target member 8 need not be recognized, an object other than the imaging target member 8 is desired to be recognized by short distance recognition are properly used according to the game progress (for example, the palm of a user is desired to be recognized by using the infrared camera 61). Also in this case, ON/OFF control for the two types of infrared light emitting sections may be performed as described above. Thus, by performing control to switch ON/OFF of the two types of infrared light emitting sections in accordance with the use case, power consumption of the infrared light emitting sections can be reduced.

This is the end of the process on the controller side. By repeatedly performing the above-described processes on the controller side and the game apparatus side in predetermined cycles, the process of calculating the indication direction and/or orientation of the controller 5 on the basis of the reflected light from the imaging target member 8 is executed.

As described above, the present embodiment adopts the configuration using the imaging target member 8 having the retroreflecting material, and the controller (hand-held information processing apparatus) having the infrared light emitting section and the imaging section. Thus, the indication direction and/or orientation of the controller 5 can be calculated with the simple system configuration.

In the present embodiment, since infrared light which is invisible light is used, viewing action of the user is not hindered. Further, even when the room is dark, it is possible to execute, for example, the process of controlling the cursor or the pointer as described above.

While infrared light is used as a non-limiting example in the present embodiment, other types of invisible light may be used.

Figure 18:
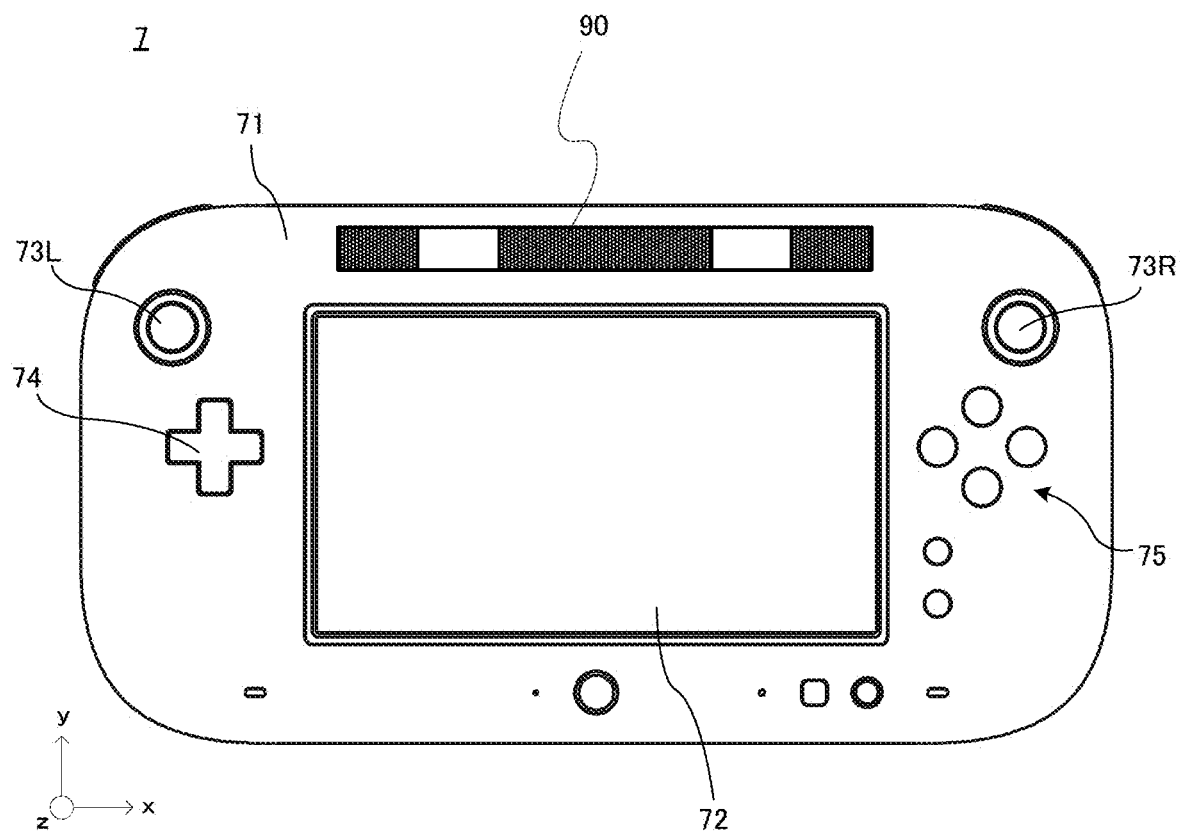
FIG. 18 is a schematic diagram illustrating a non-limiting example of a second controller.
Figure 19:
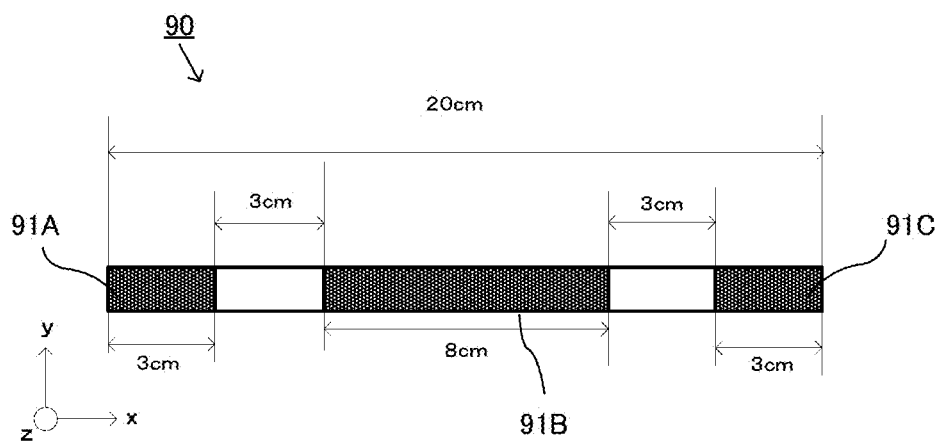
FIG. 19 is a schematic diagram illustrating the size of a second imaging target member 8.

In the above-described embodiment, as a non-limiting example, the system using one imaging target member 8 has been described. In another embodiment, a plurality of types of imaging target members having different lengths may be used. For example, a controller 7 as shown in FIG. 18 may be used as a second controller. As shown in FIG. 18, the second controller 7 includes a housing 71 which generally has a horizontally long plate-like rectangular shape. The housing 71 is small enough to be held by the user. An LCD 72 is provided near the center of a front surface of the second controller 70. Further, the second controller 7 is provided with, as operation means, two analog sticks 73L and 73R, a cross button 74, and a plurality of operation buttons 75. An imaging target member 90 is provided above the LCD 72. In the following description, the imaging target member 8 is referred to as a first imaging target member 8 and the imaging target member 90 on the second controller 70 side is referred to as a second imaging target member 90 to distinguish them from each other. The interval, at which the retroreflecting material parts are arranged, of the second imaging target member 90 is different from that of the first imaging target member 8. FIG. 19 is a schematic diagram showing the size of the second imaging target member 90. As shown in FIG. 19, the second imaging target member 90 has three retroreflecting material parts 91A, 91B, and 91C, and the size of the retroreflecting material part 91 disposed in the center is greater than the sizes of the other two retroreflecting material parts. In the example shown in FIG. 19, the retroreflecting material parts 91A and 91C disposed at the left and right ends of the imaging target member 90 each have a width of 3 cm, while the retroreflecting material part 91B disposed in the center has a width of 8 cm. The interval between the retroreflecting material parts 91A and 91B is equal to the interval between the retroreflecting material parts 91B and 91C. That is, the first imaging target member 8 and the second imaging target member 90 are different from each other in the arrangement interval of the retroreflecting material parts. A player is also allowed to perform a predetermined operation with the controller 5 being turned to the second imaging target member 90. For example, the player is allowed to operate the cursor, the pointer, and the like displayed on the LCD 72, or operate a game object displayed on the LCD 72.

The following process may be performed by using the two types of imaging target members as described above. That is, it may be determined to which of the two types of imaging target members the controller 5 is turned, and a process according to the result of the determination may be performed. First, in the process of detecting the imaging target member reflected light in step S26 described above, it is determined which of the two imaging target members causes the imaging target member reflected light, on the basis of the intervals among the three light source spots constituting the detected imaging target member reflected light. Alternatively, this determination may be made on the basis of the sizes of the three light source spots. As the result of the determination, identification information indicating the imaging target member to which the controller 5 is estimated to be currently turned is included in the imaging target member information. Then, the imaging target member information is outputted from the image processing circuit 61*d* to the control section 66. Thereafter, operation data including the imaging target member information is transmitted from the controller 5 to the game apparatus 3. In the game apparatus 3, the imaging target member to which the controller 5 is currently turned is determined on the basis of the identification information included in the operation data. Then, the process according to the determination result is appropriately executed. For example, movement of the cursor, the pointer, or the like is controlled in accordance with the direction and/or orientation of the controller 5, on either the screen of the television 2 or the screen of the LCD 72.

The size of the second imaging target member 90 is a non-limiting example. The size and arrangement interval of the retroreflecting material of the second imaging target member 90 may be different from those described above as long as the second imaging target member 90 can be distinguished from the first imaging target member 8.

In another embodiment, the de-flicker process in step S23 may be omitted. Alternatively, the de-flicker process may be executed only when the noise light is great. For example, the de-flicker process may be executed only when the number of the light source spots detected as the result of the clustering process is greater than or equal to a predetermined number. Execution of the de-flicker process can improve the detection accuracy of the imaging target member reflected light.

The filtering process in step S25 may also be omitted in another embodiment. Although the load on the process of detecting the imaging target member reflected light in step S26 can be reduced by executing the filtering process, this filtering process may be omitted when sufficient margin in the processing capability of the image processing circuit 61*d* is expected.

Regarding the processor that executes the above-described processes, the processor is mounted in the game apparatus 3 in the above embodiment. However, in another embodiment, a single processor or a plurality of processors may be mounted in the controller 5. Then, all or part of the processes performed in the game apparatus 3 in the above embodiment may be executed in the processor(s) mounted in the controller 5. Further, part of the processes performed in the controller 5 may be executed in the processor mounted in the game apparatus 3.

While the exemplary embodiments have been described herein, it is to be understood that the above description is, in all aspects, merely an illustrative example, and is not intended to limit the scope thereof. It is to be understood that various modifications and variations can be made without deviating from the scope of the exemplary embodiments.

What is claimed is:

1. An information processing system having a plurality of devices, the information processing system comprising:
   one or more reflection members, each device of the plurality of devices having at least one reflection member from the one or more reflection members;
   a hand-held information processing apparatus configured for image processing; and
   an information processing apparatus communicable with the hand-held information processing apparatus, the one or more reflection members including a retroreflecting material part and each device having a plurality of the retroreflecting material part, the hand-held information processing apparatus including:

an imaging device configured to capture an image; and a light emitting device configured to emit light, the information processing system configured to:

detect, in the image captured by the imaging device, light source images including an image of a plurality of imaging target members each having the plurality of the retroreflecting material part, the image of the retroreflecting material indicating light that has been emitted from the light emitting device and reflected by the retroreflecting material part;

calculate positions, in the captured image, of the detected light source images;

distinguish types of devices, from the plurality of devices, that include the imaging target members based on, at least, a distance between the detected light source images; and output positional information indicating the calculated positions, and the information processing apparatus configured to estimate an orientation or a position of the hand-held information processing apparatus on the basis of the output positional information, and generate an image on the basis of a result of the estimation.

2. The information processing system according to claim 1 further configured to specify the image of the retroreflecting material in the captured image on the basis of the output positional information.

3. The information processing system according to claim 2, wherein an interval between the light source images is calculated on the basis of the positional information, and the image of the retroreflecting material is specified on the basis of the interval between the light source images.

4. The information processing system according to claim 2, wherein the image of the retroreflecting material is specified on the basis of a positional arrangement between the light source images.

5. The information processing system according to claim 2, wherein the image of the retroreflecting material is specified on the basis of whether or not a positional relationship is one in which the light source images are arrayed in a straight line.

6. The information processing system according to claim 1, further comprising an imaging target member having the plurality of the retroreflecting material parts, wherein the plurality of the retroreflecting material parts are, in the imaging target member, arranged at equal arrangement intervals.

7. The information processing system according to claim 6, wherein a plurality of sets of two light source images, each having a same interval between the two light source images, are specified as an image of the retroreflecting material corresponding to the plurality of the retroreflecting material parts included in the imaging target member, on the basis of the positional information of the positions, in the captured image, of the light source images.

8. The information processing system according to claim 1, wherein brightnesses of the detected light source images or sizes thereof in the captured image are calculated.

9. The information processing system according to claim 8 further configured to specify the image of the retroreflecting material in the captured image, on the basis of the brightnesses of the light source images or the sizes thereof in the captured image.

10. The information processing system according to claim 1, wherein the information processing apparatus is further configured to generate an image including at least an indication object indicating that a position on a screen is indicated.

11. The information processing system according to claim 1 including the plurality of the retroreflecting material parts, wherein the plurality of the retroreflecting material parts are separately disposed in at least three positions.

12. The information processing system according to claim 11, wherein the plurality of the retroreflecting material parts located in at least three positions are arrayed in a straight line.

13. The information processing system according to claim 11, wherein the plurality of the retroreflecting material parts located in at least three positions are arrayed at substantially equal arrangement intervals.

14. The information processing system according to claim 1, wherein the hand-held information processing apparatus further includes a wireless communication device configured to transmit the positional information of the light source images in the captured image to the information processing apparatus.

15. The information processing system according to claim 1 further configured to determine a linearity of arrangement between a plurality of light source images and determine whether the plurality of light source images are arranged at substantially equal intervals.

16. The information processing system according to claim 15, wherein the plurality of light source images are arranged at substantially equal intervals when each light source images, from the plurality of light source images, are positioned at substantially equal distances from each other.

17. The information processing system according to claim 16, wherein first and second light source images, from the plurality of light source images, are linearly arranged when an angle formed by a straight line connecting the first and second light source images is substantially 0°.

18. The information processing system according to claim 1, wherein the distance between the detected light source images is different depending upon the type of device from the plurality of devices.

19. An information processing method for controlling an information processing system, having a plurality of devices, the information processing system including at least one or more reflection members being a retroreflecting material part, a hand-held information processing apparatus capable of image processing and configured to capture an image and emit light, and an information processing apparatus communicable with the hand-held information processing apparatus, wherein each device of the plurality of devices having at least one reflection member from the one or more reflection members and each device having a plurality of the retroreflecting material part, the information processing method comprising:

detecting, in the captured image, light source images including an image of a plurality of imaging target members each having the plurality of the retroreflecting material part, the image of the retroreflecting material indicating light that has been emitted and reflected by the retroreflecting material part;

calculating positions, in the captured image, of the detected light source images;

distinguishing types of devices, from the plurality of devices, that include the imaging target members based on, at least, a distance between the detected light source images;

outputting positional information indicating the calculated positions;

estimating an orientation or a position of the hand-held information processing apparatus on the basis of the output positional information; and generating an image on the basis of a result of the estimation.

20. A non-transitory computer-readable storage medium having store thereon an information processing program to be executed by a computer of an information processing system, having a plurality of devices, the information processing system including at least one or more reflection members being a retroreflecting material part, a hand-held information processing apparatus capable of image processing and configured to capture an image and emit light, and an information processing apparatus communicable with the hand-held information processing apparatus, wherein each device of the plurality of devices having at least one reflection member from the one or more reflection members and each device having a plurality of the retroreflecting material part, and the program, when executed by the computer, causing the information processing system to provide execution comprising:

detect, in the captured image, light source images including an image of a plurality of imaging target members each having the plurality of the retroreflecting material part, the image of the retroreflecting material indicating light that has been emitted and reflected by the retroreflecting material part;

calculate positions, in the captured image, of the detected light source images;

distinguish types of devices, from the plurality of devices, that include the imaging target members based on, at least, a distance between the detected light source images;

output positional information indicating the calculated positions;

estimate an orientation or a position of the hand-held information processing apparatus on the basis of the output positional information; and generate an image on the basis of a result of the estimation.

21. An information processing apparatus, comprising:
a processor; and
a memory configured to store computer readable instructions that, when executed by the processor, cause the information processing apparatus to:

detect, in a captured image, light source images including an image of a plurality of imaging target members each having a plurality of retroreflecting material parts, the image indicating light that has been emitted and reflected by the retroreflecting material part;

calculate positions, in the captured image, of the detected light source images;

distinguish types of devices, from a plurality of devices, that include the imaging target members based on, at least, a distance between the detected light source images; and output positional information indicating the calculated positions.

22. The information processing apparatus of claim 21 further configured to:

estimate an orientation or a position of a hand-held information processing apparatus on the basis of the output positional information; and generate an image on the basis of a result of the estimation.

* * * * *